May 4, 1954  J. S. TRUESDELL  2,677,333
CONTINUOUS MOLD-FORMING APPARATUS
Filed Nov. 19, 1951  2 Sheets-Sheet 1

INVENTOR
John S. Truesdell
BY *W. S. McDowell*
ATTORNEY

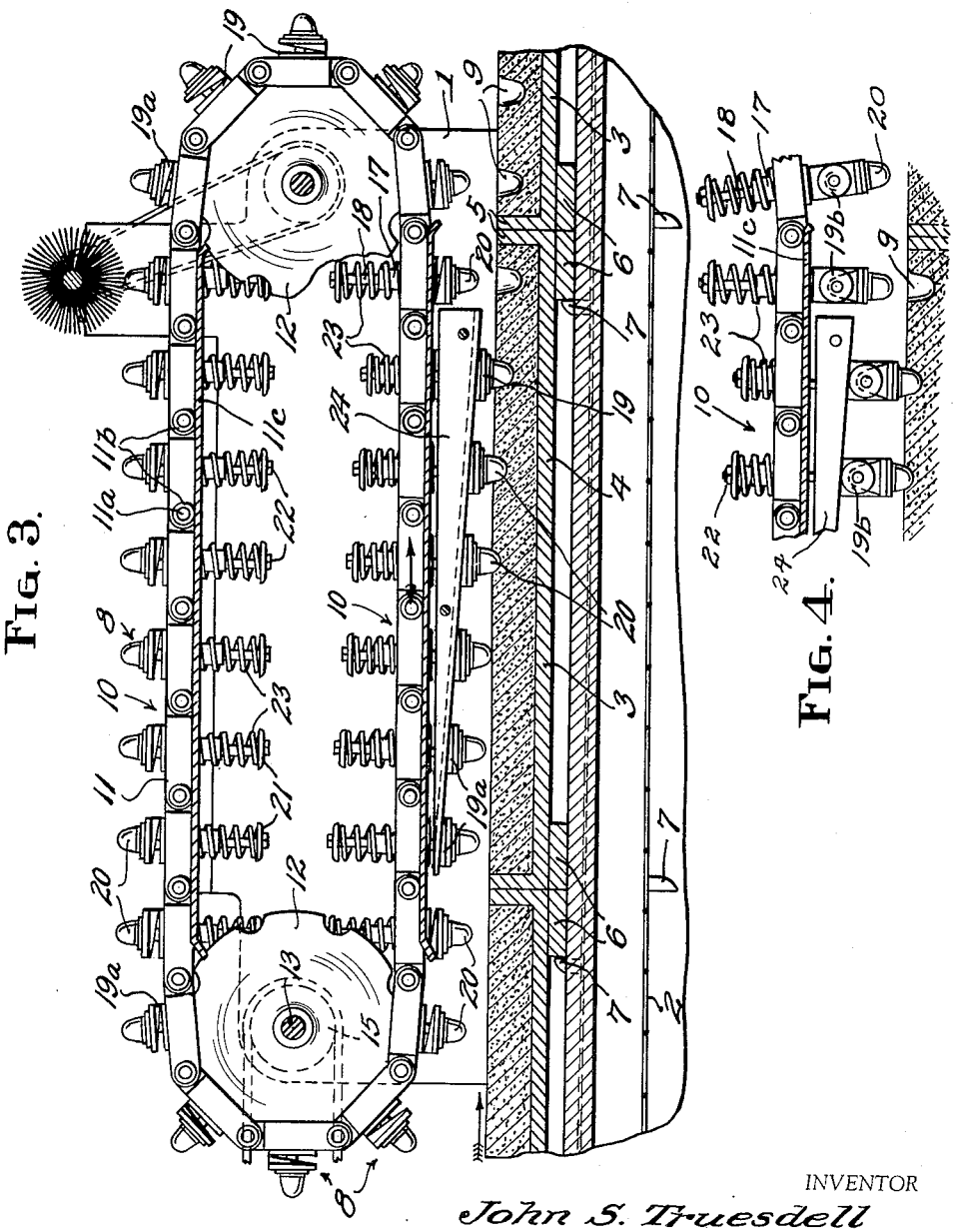

Patented May 4, 1954

2,677,333

UNITED STATES PATENT OFFICE 2,677,333

CONTINUOUS MOLD-FORMING APPARATUS

John S. Truesdell, Columbus, Ohio

Application November 19, 1951, Serial No. 257,043

2 Claims. (Cl. 107—3)

This invention refers to an improved continuous mold-forming apparatus adapted for the casting of various heated materials into bodies of desired shapes. More particularly, the invention is concerned with the formation of molds in which candy or other confectionery articles are cast for producing bodies of coherent formation.

In the art of producing candy confections, intermittently operating molding machines have been and are now being employed. In such machines, as disclosed in the prior patent of Carlson, No. 648,353 of April 24, 1900, a plurality of relatively shallow mold trays are used which are advanced in an intermittent manner along a confined course of travel by a power-driven conveyor means. These trays are filled with starch, or other similar farinaceous material, the trays being brought into registry with a vertical reciprocatory platen containing printing dies which in the synchronized operation of the apparatus, are brought into engagement with the starch filled contents of the mold trays to form in the starch regularly spaced molding cavities of desired configuration. At the time the cavities are formed, by the printing dies pressing into the starch content of the trays, the particular tray being so printed by the dies is held stationary so that molding cavities of desired configuration may be formed by the vertical movable platents. After the formation of the cavities, the mold trays are advanced so that the cavities may be filled to a desired degree with heated confection-forming materials, whereby upon the subsequent solidification of said materials in the mold cavities, articles of confection will be formed possessing the configuration of the cavities. When such articles are cooled, and obtain a solid coherent state, the mold trays are dumped on screens or spaced bars in a manner separating the starch from the formed candies, which are separately removed from the apparatus, the starch being collected and reused in the molding trays.

This intermittent operation on the part of such molding apparatus is the prime source of delay in retarding a higher rate of mold formation and confectionery output. Therefore, it is a primary object of the invention to provide a continuous mold-forming machine for use in the capacity set forth and one through the use of which the molds are die printed while said molds are traveling in unison with the printing dies and in the same direction.

Another object of the invention is to provide mold-printing apparatus in which the printing dies are carried by an endless traveling belt or chain moving in registry with and at the same linear rate of speed as the starch-containing mold trays.

A further object of the invention is to provide mold-printing apparatus for the production of confectionery articles which shall have a higher article output than apparatus heretofore employed in this capacity.

For a further understanding of the invention, reference is to be had to the following description and the accompanying drawings, wherein:

Fig. 3 is an enlarged vertical longitudinal sectional view taken through the apparatus on the plane disclosed by the line 3—3 of Fig. 2;

Fig. 4 is an enlarged fragmentary vertical sectional view taken through the printer conveyor and showing a slightly modified form of die-displacement mechanism.

Figure 1:
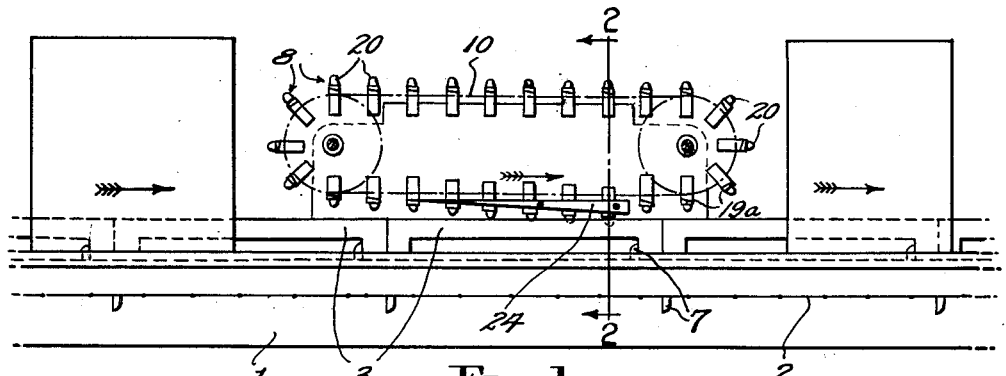
Fig. 1 is a side elevation of the continuous mold-printing apparatus formed in accordance with the present invention for use in producing candies and other articles of confection.

Referring more particularly to the drawings, there has been disclosed at 1 a frame structure which is formed to include a longitudinally extending guideway. Arranged for travel in the frame structure is an endless conveyor 2, which is suitably power-driven to effect its lineal travel at an appropriate rate of speed. Adapted to be positioned on the upper course of the conveyor 2 is a plurality of mold trays indicated at 3. Each of these trays comprises a shallow open-topped rectangular receptacle formed to embody a bottom wall 4, and upstanding marginal walls 5, the bottom walls being provided along their lower surfaces with shoulder-forming cleats 6, which are disposed for engagement with longitudinally spaced flights or dogs 7 carried by the conveyor 2 at appropriately spaced intervals, whereby movement of the conveyor will serve to advance the trays 3 longitudinally along the guideway of the frame structure 1.

The trays are adapted to be filled with starch, or other similar farinaceous material, to the level of the upper edges of the walls 5. In association with the apparatus printing dies 8 are provided, movable in synchronism with the conveyor 2, for the purpose of forming candy-receiving openings or cavities 9 in the starch bodies contained in the mold trays, as set forth in Figs. 2 and 3 of the drawings.

Instead of mounting the dies 8 on a vertically reciprocatory platen, as has been customary in the art, I mount said printing dies on an endless conveyor 10 which is supported by the frame structure above and in parallel relationship with the lower or tray-advancing conveyor 2.

In this instance, the conveyor 10 comprises spaced sets of parallel longitudinally extending endless link chains 11, the latter being equipped with laterally projecting axles 11a which carry rollers 11b at their outer ends arranged for engagement with angle bars 11c, the latter forming tracks around which the conveyor 10 operates for guided orbital movement. The chains 11 are adapted for engagement with sprocket wheels 12 mounted on axles 13, the ends of the latter being revolubly supported in bearings 14 carried by the frame structure 1. One of the axles 13 is extended and equipped with a sprocket or other driving element 15, by means of which power may be applied to the conveyor 10 in a manner driving the latter at the same rate of speed as the lower conveyor 2.

The chains 11 of the upper conveyor are united at intervals by means of transversely extending bars 16. Slidably received in openings provided in these bars, and in contiguous vertical bearing sleeves 17, are stems 18, the latter carrying at their outer ends die strips 19 from which project at longitudinally spaced intervals mold-printing dies 20. The opposite ends of the stems 18, with respect to the strips 19, carry washers 21 held by nuts or the like 22, and coiled springs 23 surround the sleeves 17 and at the inner ends thereof engage with the washers 21 to force the die strips 19 inwardly of the conveyor 10.

To move the strips outwardly against the resistance of the springs 23, so that the dies 20 carried by said strips may, at the appropriate periods, be forced into the starch material contained in the trays 3 in a manner forming the openings or cavities 9, the ends of said strips carry wedge shoes 19a, which slope in accordance with that of the wedge-shaped cam bars 24 mounted in connection with the frame structure in registry with the lower run of the conveyor 10.

In the operation of the machine, as the starch-filled mold trays move along the guideway of the frame structure into registry with the upper printing die conveyor 10, the printing dies supported by the lower run of the conveyor 10 are, by the action of the wedge-shaped cam bars 24, forced downwardly and outwardly against the resistance offered by the coil springs 23, causing the dies 8 to enter the starch bodies contained in the mold trays, as shown in Fig. 3, and producing the cavities 9. When the cavities are fully formed, the die strips 19 are abruptly released from contact with the cam bars 24, as caused by the vertical end surfaces of said cam bars. This release from engagement with the cam bars 24 enables the strips 19 to move sharply upwardly under the influence of the springs 23, effecting an instantaneous release or removal of the printing dies from the starch bodies, so that there will be no deformation in the shape of the mold cavities when the separation takes place.

In this operation, it will be noted that the mold trays and the printing die conveyor are both traveling at the same linear rate of speed. This fact, coupled with the sharp release of the dies provides for the proper development in the shape and configuration of the molding cavities. The speed of operation is greatly increased over the presently used intermittent types of machines. At present, a capacity of 18 to 20 trays per minute is considered very good with the standard intermittent construction. However, with my improved continuously operating machine, as many as 60 trays may be die-printed per minute without undue difficulty.

It will, also, be noted that in the mold-printing operation the starch-filled mold trays are caused to move without interruption in a definite, positively defined, longitudinal and horizontal path of movement. While being so advanced and maintained, the trays register with the similarly and synchronously moving lower run of the upper conveyor 10, carrying the printing dies. The lower run of conveyor 10 and the adjoining upper run of conveyor 2 are thus arranged in true parallelism. The printing dies, however, are supported in connection with conveyor 10 so that they are constrained for movement in truly vertical planes, that is, in perpendicular paths of travel with respect to the path of travel of the trays 4. The elongated guide sleeves 17 are most useful in securing such perpendicular movement of the strips 19 and associated printing dies 20. Further, the action is facilitated by the wedge shoes 19a on the end of the strips 19. The inclined surfaces of these wedge shoes precisely register with the corresponding surfaces of the cam bars 24. These features collectively enable the dies to enter and leave the starch molding bodies of the trays without undue lateral motion in producing sharply defined molding cavities of desired configuration and without interrupting the sustained forward advancing movement of the molding trays. The downwardly directed force exerted by cam bars on the strips 19 is applied precisely between a continuous pair of conveyor rolls 11b, so that there will be no tendency for the dies to tilt out of their perpendicular planes.

Figure 2:
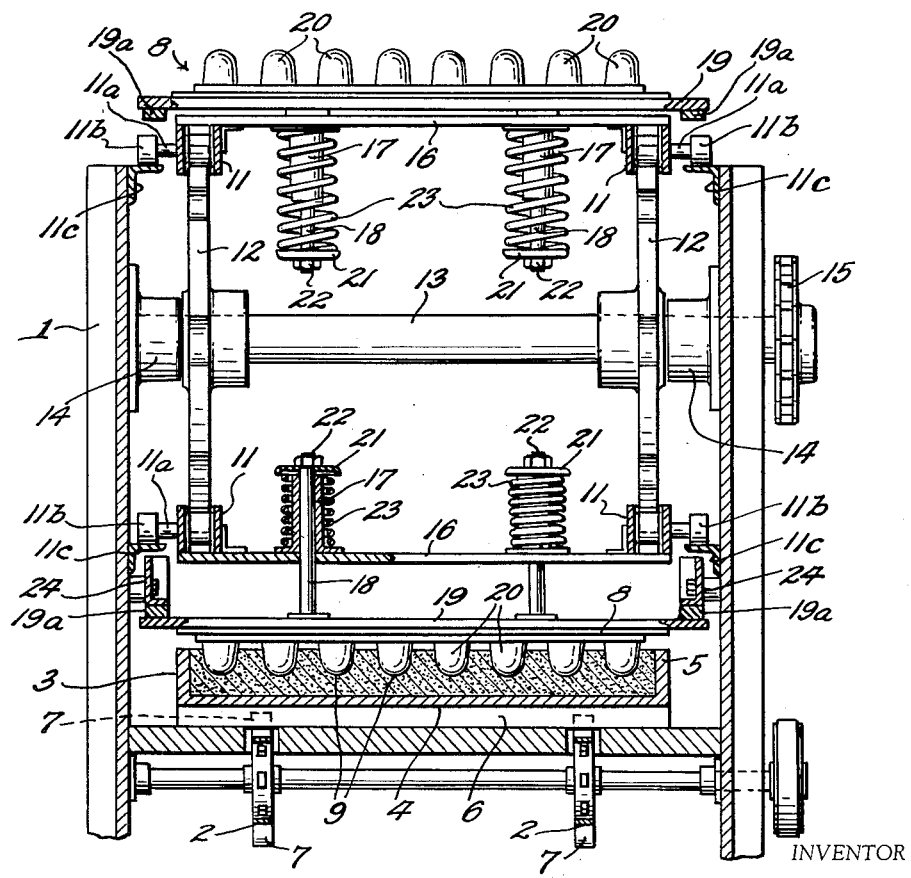
Fig. 2 is a vertical transverse sectional view taken through the apparatus on the line 2—2 of Fig. 1.

Fig. 4 of the drawings illustrates a slightly modified construction providing for the downward printing engagement of the dies 20 with the body of starch contained in the trays 4. In this form of the invention, the wedge shoes 19a as disclosed in Figs. 2 and 3 are replaced by individual roller wheels 19b which are rotatably supported upon brackets carried at each end of the die-supporting strips 19. The roller wheels 19b engage the under tapered surface of the stationary cams 24 in the same manner as the wedge shoes 19a, to cause vertical displacement of the dies 20 into printing engagement with the body of starch carried in the individual trays 4. Substantially the same action is obtained through use of the rollers 19b while materially eliminating frictional forces and drag inherent in the sliding surfaces provided by the wedge shoes 19a and the cam strips 24.

In view of the foregoing it will be seen that the present invention provides an improved continuously operable mold printing mechanism for forming candy-receiving mold cavities in continuously moving bodies of starch or other suitable powdered mold-forming material normally used in the candy-producing industry. Machines formed in accordance with the present invention are characterized by their increased speed of operation in comparison with the intermittently operable reciprocating type of printer heretofore used in the production of candy-receiving molds. Further, by reason of the true vertical or perpendicular movement of the printing dies with respect to the mold-forming material, and the synchronous linear travel of the separate conveyors, the printing dies are enabled to form extremely accurate and sharply defined mold cavities of desired configuration within the molding material without interrupting the continuous movement of the molding trays.

While preferred forms of the present invention have been disclosed in detail, it will be understood that various modifications as to details of construction may be resorted to without departing from the spirit of the invention or the scope of the following claims.

I claim:

1. In a continuous press for producing cavities in candy-forming molds, said press being of the type having a frame structure formed with a longitudinally extending guideway for the slidable reception of a plurality of open-topped mold trays containing pressure-displaceable moldable material; means for advancing said trays continuously at a predetermined rate of linear travel along said guideway; a pair of parallel sprocket-carrying shafts journaled for rotation in connection with said frame structure above said guideway; a pair of transversely spaced, parallel, longitudinally extending endless chains trained around the sprockets of said shafts; longitudinally spaced transversely extending bars secured at their ends to said chains, said bars being formed with bearing sleeves; die-carrying strips provided with stems slidably mounted in the bearing sleeves of said bars; spring means cooperative with said bars and stems and operative to apply forces to said strips serving normally to maintain printing dies carried by said strips in positions removed from printing contact with molding material present in associated trays; stationary cam means carried by said frame structure for gradually moving said strips and die means into relative cavity-forming engagement with said molding material during longitudinal advance of registering and adjacent trays and die-carrying strips; and means for imparting synchronized movement to said trays and strips, said cam means being of such effective length as to move the strip-carried dies into full cavity-printing contact and formation with said moldable tray material and upon the completion of the cavity formation to release said strips to effect abrupt retraction of the strips and their instantaneous withdrawal from said moldable material under the action of said spring means.

2. A continuous mold printer for candy-making machines comprising a first continuous longitudinally movable conveyor; a plurality of mold trays positioned on said first conveyor and movable longitudinally therewith, each of said trays being formed with an open-topped chamber for the reception of a body of powdered molding material; a second endless conveyor having a lower run positioned above and in spaced parallel relation to said first conveyor and said trays and movable in the same direction of movement as said trays; a plurality of transversely extending die-supporting bars carried on said second conveyor at longitudinally spaced intervals therealong; bearing sleeves carried by said die-supporting bars and formed with axial bores disposed perpendicularly with respect to said second conveyor; push rods slidably carried in said bearing sleeves and extending outwardly from said second conveyor; die means rigidly carried at the outer ends of said push rods, said push rods and die means being movable in said bearing sleeves between first inwardly retracted positions with respect to said second conveyor and second perpendicularly extended positions with respect to said second conveyor; spring means engaging said push rods and urging the latter to their inwardly retracted positions with respect to said second conveyor; cam follower means carried by said die means; and relatively stationary cam means positioned substantially in the plane of the lower run of said second conveyor and engageable with said cam follower means for displacing the die means carried on the lower run of said second conveyor perpendicularly downwardly into mold-printing engagement with bodies of powdered mold-forming material carried in said trays during movement of the latter longitudinally with said first conveyor, said cam means comprising an elongated strip having a uniformly tapering straight cam surface arranged to progressively move said cam follower means downwardly during linear movement of the lower run of said second conveyor, and terminating at one end in an abrupt shoulder permitting said cam follower means to snap upwardly under action of said spring means to their relatively retracted positions following disengagement from said strip.

References Cited in the file of this patent
UNITED STATES PATENTS

| Number | Name | Date |
| --- | --- | --- |
| 724,588 | Koneman | Apr. 7, 1903 |
| 805,702 | Baggaley | Nov. 28, 1905 |
| 1,717,507 | Hanns | June 18, 1929 |
| 1,781,345 | Savy et al. | Nov. 11, 1930 |
| 1,967,565 | Thurlings | July 24, 1934 |